United States Patent [19]

D'Errico

[11] Patent Number: 5,728,472
[45] Date of Patent: Mar. 17, 1998

[54] CONTROL OF ADHESION OF POLYVINYL BUTYRAL SHEET TO GLASS

[75] Inventor: John J. D'Errico, Glastonbury, Conn.

[73] Assignee: Monsanto Company, St. Louis, Mo.

[21] Appl. No.: 748,804

[22] Filed: Nov. 14, 1996

[51] Int. Cl.$^6$ .................. B32B 17/10; C08K 5/09; C08K 5/10

[52] U.S. Cl. .................. 428/437; 428/436; 524/284; 524/300; 524/306; 524/314; 524/315; 524/317; 524/394; 524/398; 524/399; 524/400; 524/556; 524/557

[58] Field of Search .................. 428/436, 437; 524/284, 300, 306, 314, 315, 317, 394, 398, 399, 400, 556, 557

[56] References Cited

U.S. PATENT DOCUMENTS

| | | | |
|---|---|---|---|
| 2,904,844 | 9/1959 | Smithies | 264/211 |
| 2,909,810 | 10/1959 | Jensch | 264/211 |
| 3,271,235 | 9/1966 | Lavin et al. | 428/437 |
| 3,551,281 | 12/1970 | Takaura et al. | 428/437 |
| 3,841,890 | 10/1974 | Coaker et al. | 106/316 |
| 3,994,654 | 11/1976 | Chyu | 425/384.4 |
| 4,017,444 | 4/1977 | Mont et al. | 524/140 |
| 4,144,217 | 3/1979 | Snelgrove et al. | 524/294 |
| 4,281,980 | 8/1981 | Hoagland et al. | 425/461 |
| 4,575,540 | 3/1986 | Cartier | 525/328.7 |
| 4,952,457 | 8/1990 | Cartier et al. | 428/425.6 |
| 5,013,779 | 5/1991 | Fariss et al. | 524/314 |
| 5,137,954 | 8/1992 | DasGupta et al. | 524/284 |

FOREIGN PATENT DOCUMENTS

A1-185863  7/1986  European Pat. Off. .

OTHER PUBLICATIONS

Banerjee, A.K., et al., "Alkaline Earth Metal Complexes: Mixed Ligand Complexes of Some Organic Compounds of Magnesium with Nitrogen Donor Ligands," Journal of the Indian Chemical Society, Sep. 1982, No. 9, 1020.

Primary Examiner—D. S. Nakarani
Attorney, Agent, or Firm—Fitzpatrick, Cella, Harper & Scinto

[57] ABSTRACT

A sheet for laminated safety glass comprising polyvinyl butyral resin containing a multivalent metal-substituted aromatic chelate compound in an amount effective to control adhesion of the sheet to glass.

18 Claims, No Drawings

CONTROL OF ADHESION OF POLYVINYL BUTYRAL SHEET TO GLASS

BACKGROUND OF THE INVENTION

1. Field of the Invention

The present invention relates to control of adhesion of polyvinyl butyral (PVB) sheet to glass in laminated safety-glass. In particular, the invention relates to a PVB sheet containing a chelate compound as an adhesion control agent.

2. Related Background Art

Plasticized PVB sheet is used in light-transmitting laminates containing one or more rigid layers, such as glass, for applications such as building and vehicle windows, show cases, protective glass for pictures, documents and the like. The plasticized sheet absorbs energy and prevents disintegration when, for example, the head of a vehicle occupant strikes the rigid layer of a laminated window after a sudden stop or a foreign object is propelled against the outside of the laminate.

Moisture on the order of up to about two weight percent of the sheet can be absorbed from a humid environment during preparation of the glass laminate or later in use around the exposed sheet edge. This is undesirable since it promotes delamination from the glass around the border of the laminate.

Adhesion control agents (ACAs) in the sheet formulation control adhesion of the sheet to glass to provide energy absorption on impact of the glass laminate. Though suitable for this, some ACAs result in zero adhesion at high interlayer moisture levels. Multivalent metal salts of organic monocarboxylic acids control such adhesion and desirably are relatively insensitive to sheet moisture absorption. See U.S. Pat. No. 4,952,457, issued Aug. 28, 1990 where magnesium 2-ethylbutyrate is disclosed for this use. Unfortunately, though moisture tolerant, such organic monocarboxylic acid metal salt ACAs have other deficiencies in PVB formulations which have led to the evolution of this invention.

SUMMARY OF THE INVENTION

Now improvements have been made in moisture insensitive adhesion control agents for PVB formulations overcoming problems in the prior art.

Accordingly, a principal object of this invention is to provide adhesion control agents for PVB formulations used in sheet for laminated safety glass which are relatively insensitive to moisture in the sheet yet do not have functional deficiencies associated with prior art ACAs.

The present invention provides a sheet for laminated safety glass comprising polyvinyl butyral resin containing a multivalent metal-substituted aromatic chelate compound in an amount effective to control adhesion of the sheet to glass.

The invention also provides a laminated safety-glass comprising two sheets of glass with a sheet disposed therebetween comprised of polyvinyl butyral resin containing a multivalent metal-substituted aromatic chelate compound in an amount effective to control adhesion of the sheet to the glass.

The substituted aromatic chelate moiety is preferably selected from one of the following structures:

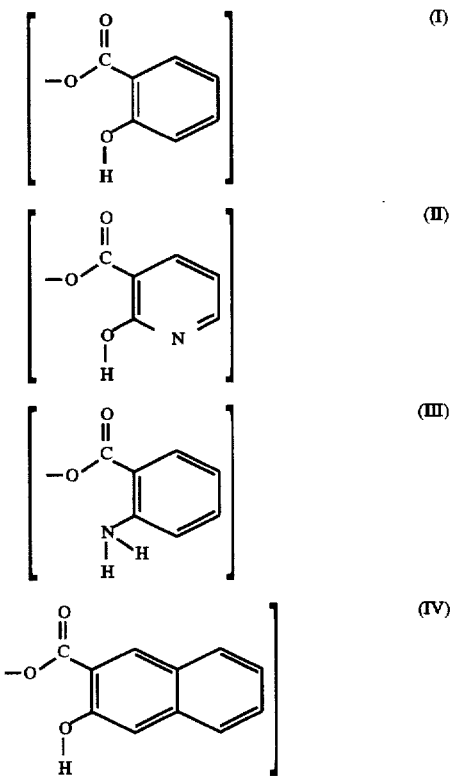

Thus, for magnesium salicylate the structural formula is:

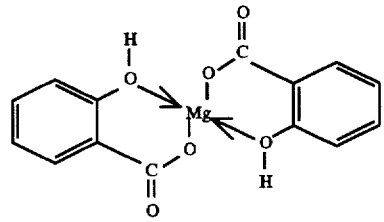

DETAILED DESCRIPTION OF THE INVENTION

The adhesion control agent in the sheet of the invention is predominantly a multivalent, preferably divalent metal-substituted aromatic chelate compound. As long as a substituted aromatic, the anion may differ from, but is preferably selected from, structures I, II, III and IV above.

The metal cation may vary and be any having an oxidation number up to six. For example, divalent (magnesium), trivalent (aluminum), tetravalent (zinc) metal cations are usable. Divalent metal cations are preferred with magnesium particularly preferred. Exemplary compounds include, magnesium salicylate (MgSal), magnesium nicotinate (MgNic), magnesium di-(2-aminobenzoate) (MgAmb) and magnesium di-(3-hydroxy-2-napthoate) (MgNap). MgSal may be purchased from Spectrum Chemical Manufacturing Corp., Gardena, Calif. MgNic, MgAmb, and MgNap may be prepared according to procedures described in Banerjee et al., *J. Indian Chem. Soc.*, 1982, pp. 1020–1021, which is incorporated herein by reference.

Metal-substituted aromatic chelate compounds (one or more) in the formulation of the PVB sheet control its adhesion to glass and importantly maintain it within a desired range over a relatively broad range of sheet moisture levels which can reach as high as about two weight percent.

Monovalent metal salts of $C_1$ to $C_8$ organic, preferably aliphatic, monocarboxylic acid may also be present in the sheet. Such salts are present usually as a result of carryover from the process of synthesizing PVB resin—i.e., as a result of the step of neutralizing the acid catalyst used in forming PVB resin from polyvinyl alcohol. Potassium acetate is typically used and remains trapped in the resin after drying. Such monovalent metal salt in the sheet affects adhesion the same as does the multivalent chelate compound, but is less resistive to moisture rendering it less effective than the latter.

The moisture insensitive metal-substituted aromatic chelate compounds have an advantage over multivalent monocarboxylic acid salts previously used for moisture insensitive adhesion control. As will be further described, when such acid salts are used, e.g., magnesium 2-ethylbutyrate, a phenomenon called "binding" typically occurs in which the salt reacts with and binds to PVB during melt processing (e.g., extrusion) of the PVB formulation into the sheet. The bound salt is then unavailable for adhesion control which results in the sheet adhering too strongly to the glass in the finished laminate resulting in low impact strength. Furthermore, the percentage of bound acid salt proportionately increases as the initial level in the formulation is increased. Unexpectedly, multivalent-substituted aromatic chelate compounds do not bind to PVB during extrusion thereby providing advantageously predictable and consistent adhesion control while preserving moisture insensitivity.

For the adhesion level desired, the amount of multivalent-substituted aromatic chelate in the sheet formulation should be such as to provide at least three ethylenediaminetetraacetic acid (EDTA) titer units (defined hereinafter). The total concentration of ACA in the sheet (i.e., including any monovalent metal acid salt) is generally about 0.01 to 0.1 (preferably 0.01 to 0.05) weight percent based on PVB resin.

PVB resin has a weight average molecular weight greater than 70,000, preferably about 100,000 to 250,000, as measured by size exclusion chromatography using low angle laser light scattering. On a weight basis PVB typically comprises 15 to 25%, preferably about 17 to 19% hydroxyl groups calculated as polyvinyl alcohol (PVOH); 0 to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

PVB resin is produced by known aqueous or solvent acetalization processes reacting PVOH with butyraldehyde in the presence of acid catalyst, followed by neutralization of the catalyst, separation, stabilization and drying of the resin. It is commercially available from Monsanto Company, St. Louis, Mo. as Butvar® resin.

Plasticized PVB as sheet at a non-critical thickness of about 0.13 to 1.3 mm is formed by mixing resin and plasticizer and preferably (in commercial systems) extruding the mixed formulation through a sheet die, i.e., forcing molten, plasticized PVB through a horizontally long vertically narrow die opening substantially conforming in size to the sheet being formed, or by casting molten polymer issuing from an extrusion die onto a die roll in close proximity to the die exit to impart desired surface characteristics to one side of the polymer. When the roll surface has minute peaks and valleys, the side of the sheet contacting the roll will have a rough surface generally conforming to the valleys and peaks. Roughness on the other side can be provided by the design of the extrudate die opening as shown, for example, in FIG. 4 of U.S. Pat. No. 4,281,980. Other known techniques for producing a rough surface on one or both sides of an extruding sheet involve specifying and controlling one or more of the following: polymer molecular weight distribution, water content and temperature of the melt. These techniques are disclosed in U.S. Pat. Nos. 2,904,844; 2,909,810; 3,994,654; 4,575,540 and European Patent No. 0185,863. Embossing downstream of the extrusion die also roughens the sheet surface. As known, this roughness is temporary to facilitate deairing during laminating after which the elevated temperature and pressure during bonding of the sheet to glass melts it smooth. Lamination to glass is according to generally known procedures.

Sheets of the present invention may optionally contain additives (other than ACA) to enhance performance such as dyes, pigments, ultraviolet light stabilizers, antioxidants, and the like.

The PVB resin of the sheet is typically plasticized with about 20 to 80 and more commonly 25 to 45 parts plasticizer per hundred parts of resin. Plasticizers commonly employed are esters of a polybasic acid or a polyhydric alcohol. Suitable plasticizers are triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217. Also mixed adipates made from $C_4$ to $C_9$ alkyl alcohols and cyclo $C_4$ to $C_{10}$ alcohols as disclosed in U.S. Pat. No. 5,013,779. $C_6$ to $C_8$ adipate esters such as hexyl adipate are preferred plasticizers.

This invention will be better understood from the following Examples. However, one skilled in the art will readily appreciate that the specific methods and results discussed are merely illustrative and no limitation is implied. All parts and percentages are by weight unless otherwise specified.

Properties reported in the following Examples are measured substantially in accordance with the following procedures.

The metal chelate salt concentration is stated as ethylenediaminetetraacetic acid "EDTA" titer. The procedure for obtaining EDTA titer is as follows: 7 gm of plasticized PVB sheet is dissolved in methanol. 12 to 15 mls of Buffer 10 solution (ammonium chloride/ammonium hydroxide) and 12 to 15 drops of Erichrome Black T indicator in methanol are added to the methanol solution which turns the solution bright magenta pink. The % transmission on a light meter is adjusted to about 80% by setting the light intensity before commencing titration. The solution is a deep indigo blue when the titration is complete. One EDTA titer unit equals $1 \times 10^{-7}$ mole of multivalent metal salt per gm PVB. The concentration of ACA salt present in a sample corresponds to the titer value determined from this titration procedure.

Adhesion of sheet to glass is measured using a pummel adhesion test (pummel adhesion value has no units). Two ply glass laminates are prepared, conditioned to minus 17° C. and each is manually pummeled with a 1 pound (454 g) hammer to break the glass. All broken glass unadhered to the PVB sheet is removed. The glass left adhered to the sheet is visually compared with a set of standards of known pummel scale, the higher the number, the more glass that remains adhered to the sheet—i.e. at pummel zero no glass is adhered and at pummel 10, 100% of the glass is adhered to the sheet surface. Desirable, impact dissipation occurs at a pummel adhesion value of 3 to 7, preferably 4 to 6. At a pummel adhesion value of less than 3 too much glass is lost from the sheet, whereas at a pummel adhesion of more than 7, adhesion of the glass to the sheet is generally too high and a poor shock absorber.

Glass laminates are prepared using sheets of the invention by known procedures. The PVB sheet is interposed between two glass layers (or assembled with a single glass layer) and then the assembly is subjected in an autoclave to about 90° to 165° C. at a pressure of about 1034 to 2067 kPa for at least ten minutes to tightly bond the layers and form the safety glass laminate.

EXAMPLE 1

Binding of Adhesion Control Agents to Polyvinyl Butyral Resin in Sheet Formulations PVB resin commercially available from Monsanto, St. Louis, Mo. as BUTVAR® resin was mixed with 32–38 parts per 100 parts resin of various plasticizers identified as (A), (B) and (C) below. An ACA was dissolved in 250 CC of water (the amount of ACA is shown as Titer (total) in the Tables 1–3 below) and added to the PVB plasticizer mixture which was then extruded (4½ inch (11.4 cm) extruder screw) at about 200° C. into sheet at about 300–350 lbs/hr.

EDTA titer was measured according to the procedure previously described. Two samples for EDTA titration were prepared. The first (identified as (1) in the formula below) measures unbound free multivalent metal ACA present. The pH of the second sample is brought to 4 with methanolic hydrochloric acid solution, this detaches the metal cation from its bound state with the resin. The second titration sample was then titrated (identified as (3) in the formula below) with EDTA to measure total magnesium ACA content.

Percent ACA bound to PVB is calculated from the following:

$$\% \text{ ACA bound} = [(3)-(1)/(3)] \times 100$$

(A) Triethylene Glycol Diheptanoate

TABLE 1

| ACA Identity | EDTA Titer (unbound) | HCl/EDTA Titer (total) | % ACA Bound |
|---|---|---|---|
| MgBut[(1)] | 8.3 | 14.6 | 43.2 |
| MgSal[(2)] | 29.5 | 29.3 | 0 |

[(1)]magnesium 2-ethyl butyrate (control)
[(2)]magnesium salicylate (B) Hexyl Cyclohexyladipate

TABLE 2

| ACA Identity | EDTA Titer (unbound) | HCl/EDTA Titer (total) | % ACA Bound |
|---|---|---|---|
| MgBut | 3.8 | 30.6 | 87.6 |
| MgSal | 49.4 | 49.6 | 0 |

(C) Dihexyl Adipate

TABLE 3

| ACA Identity | EDTA Titer (unbound) | HCl/EDTA Titer (total) | % ACA Bound |
|---|---|---|---|
| MgBut | 13.5 | 10.4 | 23.0 |
| MgSal | 40.2 | 40.0 | 0 |

Independent of plasticizer, the use of a chelate adhesion control agent such as magnesium salicylate results in a substantial reduction of ACA binding to PVB compared to magnesium 2-ethyl butyrate, a non-chelate adhesion control agent.

EXAMPLE 2

Adhesion Control of Glass to Plasticized PVB Sheet Containing MgSal as ACA

Glass laminates were prepared according to the method described above (15.2×15.2 cm) using triethylene glycol diheptanoate as the plasticizer in the sheet formulation and pummel adhesion values for the laminates were determined:

TABLE 4

| ACA Identity | EDTA Titer In Sheet | Pummel Adhesion |
|---|---|---|
| MgSal | 10 | 7 |
| MgSal | 25 | 5.8 |

The magnesium salicylate ACA of the present invention provided effective adhesion control in the glass laminate.

It is apparent from the foregoing that many changes and modifications can be made without departing from the spirit and scope of the present invention.

What is claimed is:

1. A sheet for laminated safety glass comprising polyvinyl butyral resin containing a multivalent metal-substituted aromatic chelate compound in an amount effective to control adhesion of the sheet to glass.

2. The sheet of claim 1, wherein the metal is divalent, trivalent, or tetravalent and the chelate portion of the compound is selected from one of the following structures:

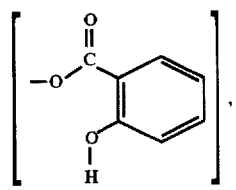

,

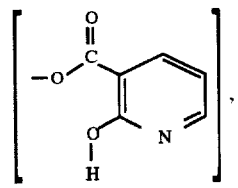

,

-continued

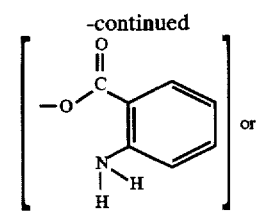  or

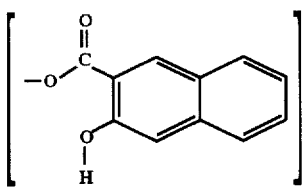

3. The sheet of claim 2, wherein the metal is divalent.
4. The sheet of claim 3, wherein the metal is magnesium.
5. The sheet of any of the claims 1, 2, 3 or 4 wherein the chelate portion is

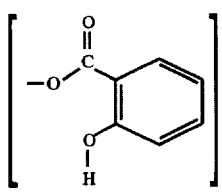

6. The sheet of claim 5, further comprising a plasticizer.
7. The sheet of claim 6, wherein the plasticizer is an ester of a polybasic acid or a polyhydric alcohol.
8. The sheet of claim 7, wherein the plasticizer is selected from the group consisting of triethylene glycol diheptanoate, triethylene glycol di(2-ethyl butyrate), triethylene diethylhexanoate, diisononyl adipate, dihexyl adipate, heptylnonyl adipate, hexyl cyclohexyladipate and dibutyl sebacate.
9. The sheet of claim 8, further comprising sodium or potassium acetate.
10. A laminated safety-glass comprising two sheets of glass with a sheet disposed therebetween comprised of a polyvinyl butyral resin containing a multivalent metal-substituted aromatic chelate compound in an amount effective to control adhesion of the sheet to the glass.
11. The laminated safety-glass of claim 10, wherein the metal is divalent, trivalent or tetravalent and the chelate portion of the compound is selected from one of the following structures:

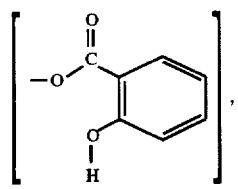

-continued

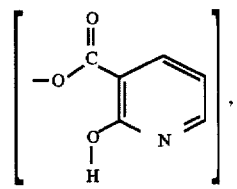

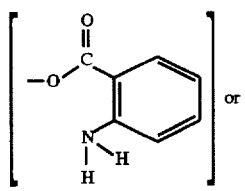 or

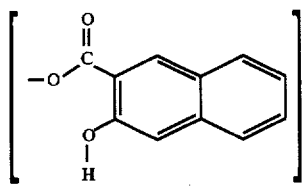

12. The laminated safety glass of claim 11 wherein the metal is divalent.
13. The laminated safety glass of claim 12 wherein the metal is magnesium.
14. The laminated safety glass of any of the claims 10, 11, 12 or 13 wherein the chelate portion is

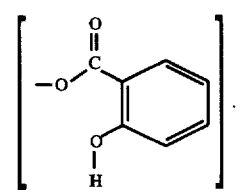

15. The laminated safety-glass of claim 14, further comprising a plasticizer.
16. The laminated safety-glass of claim 15, wherein the plasticizer is an ester of a polybasic acid or a polyhydric alcohol.
17. The laminated safety-glass of claim 16, wherein the plasticizer is selected from the group consisting of triethylene glycol diheptanoate, triethylene glycol di(2-ethyl butyrate), triethylene diethylhexanoate, diisononyl adipate, dihexyl adipate, heptylnonyl adipate, hexyl cyclohexyladipate and dibutyl sebacate.
18. The laminated safety-glass of claim 17, further comprising sodium or potassium acetate.

* * * * *